US009193573B1

(12) United States Patent
Troy

(10) Patent No.: US 9,193,573 B1
(45) Date of Patent: Nov. 24, 2015

(54) PROCESS FOR MEASURING AND CONTROLLING EXTENSION OF SCISSOR LINKAGE SYSTEMS

(71) Applicant: The Boeing Company, Chicago, IL (US)

(72) Inventor: James J. Troy, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 395 days.

(21) Appl. No.: 13/765,426

(22) Filed: Feb. 12, 2013

Related U.S. Application Data

(63) Continuation-in-part of application No. 13/470,125, filed on May 11, 2012, now Pat. No. 8,943,892.

(51) Int. Cl.
*B25J 9/00* (2006.01)
*B66F 11/04* (2006.01)

(52) U.S. Cl.
CPC .................................... *B66F 11/042* (2013.01)

(58) Field of Classification Search
CPC ............. G05B 2219/39213; G05B 229/39217; G05B 39/253; G05B 39/254; G05B 39/535
USPC ........... 73/1.37, 602; 702/127; 700/1, 90, 260
See application file for complete search history.

(56) References Cited

U.S. PATENT DOCUMENTS

| | | | | | |
|---|---|---|---|---|---|
| 4,594,671 | A | * | 6/1986 | Sugimoto et al. | 700/263 |
| 4,734,866 | A | * | 3/1988 | Bartelt et al. | 700/256 |
| 4,975,856 | A | * | 12/1990 | Vold et al. | 700/263 |
| 5,174,325 | A | * | 12/1992 | Okel et al. | 137/317 |
| 5,294,873 | A | * | 3/1994 | Seraji | 318/568.1 |
| 5,377,310 | A | * | 12/1994 | Jain et al. | 700/260 |
| 5,546,508 | A | * | 8/1996 | Jain et al. | 700/260 |
| 7,194,358 | B2 | | 3/2007 | Callaghan et al. | |
| 8,725,294 | B2 | * | 5/2014 | Gienger | 700/259 |
| 2008/0163750 | A1 | * | 7/2008 | Yuan et al. | 91/402 |
| 2011/0031347 | A1 | * | 2/2011 | Allen | 244/99.3 |

FOREIGN PATENT DOCUMENTS

WO WO95/23054 * 8/1995

* cited by examiner

*Primary Examiner* — J M Saint Surin
(74) *Attorney, Agent, or Firm* — Ostrager Chong Flaherty & Broitman P.C.

(57) ABSTRACT

A process for measuring and controlling the position and velocity of one moving part of a scissor lift device through the measurement of another moving part of the scissor lift device. The position and velocity of the moving part (e.g., a platform of the scissor lift device) are computed using kinematics and Jacobian functions that define the position and velocity in terms of the measured degree of freedom. The process provides continuous, closed-form computation of the position and velocity of a platform carried by a scissor linkage mechanism during the latter's extension, which enables applications for motion sensing and control of linkage extension types of systems.

20 Claims, 9 Drawing Sheets

PROCESS FOR MEASURING AND CONTROLLING EXTENSION OF SCISSOR LINKAGE SYSTEMS

RELATED PATENT APPLICATION

This application is a continuation-in-part of and claims priority from U.S. patent application Ser. No. 13/470,125 filed on May 11, 2012.

BACKGROUND

This disclosure generally relates to the measurement and control of the extension (or retraction) of scissor linkage mechanisms incorporated in scissor linkage systems, such as scissor lift devices.

Scissor lift devices are commonly used to lift workers and equipment during construction, painting, maintenance, assembly and manufacturing operations, including aircraft assembly. Scissor lift devices typically include one or more sets or stacks of scissor linkages operated by an actuator, such as a hydraulic cylinder, on a motor-driven base, and a payload platform mounted on the upper ends of the scissor linkages. The payload platform can be moved by extending or retracting the one or more sets or stacks of scissor linkages.

Scissor linkage mechanisms are commonly used in many types of applications, but measurement of the extension position and/or velocity of the platform (or an end effector mounted to the platform) is usually not available. One of the technical issues associated with scissor linkage mechanisms is that the motion of the payload platform has a non-linear relationship to the actuator position. This makes it difficult to measure the position and velocity of the platform or end effector and limits the usefulness of standard motion control techniques that rely on having a linear relationship between input and output.

For existing scissor lift devices, the operators do not know how high the lift has been extended, other than by visual estimation. The process to extend the scissor lift is performed by the operator watching visual landmarks as the mechanism is moving. Existing solutions typically use open-loop control where the operator holds a button which activates the actuator. The operator keeps the button pressed until the platform reaches the desired location, and then releases the button. With this form of human-in-the-loop control, operators have no way to automatically instruct the scissor lift to go to an exact location or return to a prior location. Also, since the extension speed of the lift is non-linear, the speed of the extension is not easy to control. In addition, since the position and velocity are not easy to measure and control in existing systems, automated control of the scissor lift devices has been limited to cases with simple on/off control, where physical limit switches are used to turn off the motion actuator.

Existing controllers for these types of devices usually rely only on a force input of the motion actuator, but since the rate of motion of the payload platform or end effector of a scissor lift is a non-linear function of the input, the motion rate changes as the scissor stack extends. This means that for a constant amount of input force, the extension velocity of the scissor lift will be changing throughout its motion range. This makes it difficult for the operator to provide constant velocity control, and makes it difficult (and possibly unsafe) to implement automated motion control.

Possible solutions to acquire the position and velocity of the platform (or end effector) of scissor lift devices could involve either direct physical measurement at run-time or table-lookup types of solutions.

For direct measurement, string encoders/potentiometers with very long strings attached between the base and the platform could be used if entanglement with the string is not a concern. But there can be problems with wrapping and stretch issues for long strings, resulting in inaccurate data. Another direct measurement solution is to use proximity sensors, such as laser-based distance measurement sensors, but these have occlusion issues.

Another common approach to addressing similar non-linear types of motion is to use a process based on table look-up. In these types of solutions the output variable (e.g., height) is measured at various known locations of the input actuator. This gives discrete output positions based on prior physical measurement. At run-time the system would use the input position to look-up the associated height in a table. Linear interpolation between stored points could be used to give approximation of height (with variable accuracy) between stored points, but if precise positioning is required, a new measurement will need to be taken at the desired position. Velocity control of the output would not be practical with this approach.

Providing continuous extension measurement for control of scissor linkage mechanisms would address applications requiring precise movement of the platform mounted to the scissor linkage mechanism, which would improve overall system performance. In addition, it would improve situational awareness, which may lead to improved safety of these systems. If position and velocity feedback were available to implement a continuous motion controller, then precise positioning could be achieved. With such capability, automated applications can be developed and enhanced collision avoidance and safety features can be implemented.

SUMMARY

The subject matter disclosed herein includes a process for measuring and controlling the position and velocity of one moving part of a scissor lift device through the measurement of another moving part of the scissor lift device. The position and velocity of the moving part (e.g., a platform of the scissor lift device) are computed using forward kinematics and Jacobian functions that define the position and velocity in terms of the measured degree of freedom. The process provides continuous, closed-form computation of the position and velocity of a platform carried by a scissor linkage mechanism during the latter's extension, which enables applications for motion sensing and control of linkage extension types of systems. Applications include measurement and control of the position and speed of moving parts of scissor lift devices (such as man-lifts or table lifts) without use of other types of sensors that may have occlusion or entanglement problems. Precise control of these scissor linkage devices will allow users or automated controllers to move to specific locations at controlled velocities, which is not possible with existing systems.

In particular, the disclosed method enables the determination of the position and velocity (rate) of the payload platform (or end effector) and other points of interest on the scissor linkage of a scissor lift device. The disclosed method overcomes the problem posed by the non-linear relationship of the platform motion to the actuator position.

The process described herein is generalized to address scissor linkage mechanisms with any number of scissor stages. In addition to providing continuous position measurement, the process also provides continuous velocity measurement. These measurement capabilities enable both open- and closed-loop position and velocity control of scissor linkage mechanisms that can be applied to any type of scissor lift device. Methods for transferring this data to the standard interfaces on motion controllers are also disclosed. The position and velocity data of the platform (or end effector) can also be displayed to the user at run-time to provide improved situational awareness. The process presented here enables enhanced user input control and interaction methods, as well as automation of these types of systems.

The concept disclosed herein has been generalized to address any type of multi-stage scissor linkage mechanism for both position and velocity measurement. A process for feedback control of scissor linkages systems using this type of measurement is also described. While the process will be disclosed herein with reference to scissor linkage mechanisms used for vertical lifting, the techniques presented here are not limited to vertical motions. Other orientations, such as horizontal extension of the scissor linkage, are also within the scope of this concept. The term "scissor linkage system", as used herein, should be construed broadly to include both scissor lift devices and devices (such as extendable arms) which can move in a non-vertical direction.

For many types of scissor linkage systems, a position encoder can be attached to an extending actuator (such as a hydraulic, pneumatic or motor-driven extending actuator) or to a rotating actuator (such as a lead screw-based drive system). Currently these types of scissor linkage systems are not automated, but applying the measurement and control processes described in this disclosure to these application areas would enable automation, as well as more precise types of manual control.

One aspect of the subject matter disclosed herein is an automated method, performed by a control system of a scissor linkage system, for controlling the position of a platform carried by an actuatable scissor linkage mechanism. The method comprises the following steps: receiving data representing a target platform position; calculating an actuator target position as an inverse kinematics function of the target platform position; and controlling an actuator to move to the target actuator position. The method may further comprise: generating current actuator position data representing a current position of the actuator; calculating a current platform position as a forward kinematics function of the current actuator position; and displaying text and/or symbols representing the current platform position.

In accordance with a further aspect, the method for controlling the position of a platform carried by an actuatable scissor linkage mechanism may comprise: receiving data representing a target platform position; calculating an actuator target position as an inverse kinematics function of the target platform position; controlling an actuator to move to the target actuator position; generating current actuator position data representing a current position of the actuator; calculating a target actuator velocity as an inverse Jacobian function of the current actuator position and the target platform velocity; and controlling the actuator to move toward the target actuator position at the target actuator velocity. This method may further comprise: generating current actuator velocity data representing a current velocity of the actuator; calculating a current platform velocity as a Jacobian function of the current actuator position and the current actuator velocity; and displaying text and/or symbols representing the current platform position and the current platform velocity.

Another aspect of the subject matter disclosed herein is a scissor linkage system comprising: a frame; a scissor linkage mechanism comprising a first link that is pivotably coupled to the frame at a first pivot point and a second link that is pivotably coupled to the first link at a second pivot point; a platform coupled to and supported by the scissor linkage mechanism; an actuator having first and second actuator positions, the first and second links being rotatable relative to each other about the second pivot point and the scissor linkage mechanism being extendible in a direction away from the frame when the position of the actuator changes from the first actuator position to the second actuator position, the platform being in first and second platform positions when the actuator is in the first and second actuator positions respectively; and a computer system comprising memory storing an actuator control program for controlling the actuator, and one or more processing units capable of executing operations in accordance with the actuator control program in response to receipt of data representing a target platform position. The executable operations may comprise: (a) calculating a target actuator position as an inverse kinematics function of the target platform position; and (b) controlling the actuator to move to the second actuator position when the target platform position is the second platform position.

A further aspect of the subject matter disclosed herein is a scissor linkage system comprising: a frame; a scissor linkage mechanism comprising a first link that is pivotably coupled to the frame at a first pivot point and a second link that is pivotably coupled to the first link at a second pivot point; a platform coupled to and supported by the scissor linkage mechanism; an actuator having first and second actuator positions, the first and second links being rotatable relative to each other about the second pivot point and the scissor linkage mechanism being extendible in a direction away from the frame when the position of the actuator changes from the first actuator position to the second actuator position, the platform being in first and second platform positions when the actuator is in the first and second actuator positions respectively; an actuator position sensor that is coupled to the actuator and capable of outputting current actuator position data representing a current position of the actuator; and a computer system comprising memory storing an actuator control program for controlling the actuator, and one or more processing units capable of executing operations in accordance with the actuator control program in response to receipt of the current actuator position data and data representing a target platform velocity. The executable operations may comprise: (a) calculating a target actuator velocity as an inverse Jacobian function of the current actuator position and the target platform velocity; and (b) controlling the actuator to move toward the second actuator position at the target actuator velocity.

In accordance with the embodiments disclosed herein, the computer system comprises a first processing unit that is programmed to execute operations (a), a second processing unit that is programmed to execute operations (b), and a third processing unit which is programmed to convert commands from the first processing unit which are not in a format acceptable to the second processing unit into commands in a format acceptable to the second processing unit. The system may further comprise an actuator position sensor that is coupled to the actuator and in communication with the third processing unit, the actuator position sensor being capable of sending to the third processing unit actuator position data representing a current actuator position in a format not acceptable to the first processing unit, and the third processing unit being programmed to convert actuator position data from the actuation position sensor which is not in a format acceptable to the first processing unit into actuator position data which is in a format acceptable to the first processing unit.

Yet another aspect of the subject matter disclosed herein is a scissor linkage system comprising: a frame; a scissor linkage mechanism mounted to the frame; a platform coupled to and supported by the scissor linkage mechanism, the platform being movable away from the frame when the scissor linkage mechanism is extended; an actuator coupled to the scissor linkage mechanism for causing the scissor linkage mechanism to extend when the actuator is moved in an actuation direction; means for receiving data representing a target platform position; means for calculating an actuator target position as an inverse kinematics function of the target platform position; and means for controlling the actuator to move to the target actuator position. This system may further comprise: an actuator position sensor that is coupled to the actuator and capable of generating current actuator position data representing a current position of the actuator; means for calculating a target actuator velocity as an inverse Jacobian function of the current actuator position and the target platform velocity; means for controlling the actuator to move toward the target actuator position at the target actuator velocity; an actuator velocity sensor that is coupled to the actuator and capable of generating current actuator velocity data representing a current velocity of the actuator; means for calculating a current platform velocity as a Jacobian function of the current actuator position and the current actuator velocity; and means for displaying text and/or symbols representing the current platform position and the current platform velocity.

Other aspects of systems and processes for measuring and controlling the extension of scissor linkage mechanisms are disclosed and claimed below.

BRIEF DESCRIPTION OF THE DRAWINGS

FIG. 9 is a diagram showing an example actuator configuration for a single-stage scissor linkage mechanism in which the actuator (not shown) has a length a.

Reference will hereinafter be made to the drawings in which similar elements in different drawings bear the same reference numerals.

DETAILED DESCRIPTION

The processes disclosed herein have application in scissor linkage systems having any number of scissor stages and can be utilized to provide, for example, lift height measurement and control to a scissor lift device that supports an end effector (such as a non-destructive inspection unit) and to full-size man-lift types of scissor lifts. Mid-sized table lift types of mechanisms could also be used with this type of measurement and control application. Embodiments of the process will be disclosed hereinafter with reference to scissor linkage mechanisms used for vertical lifting.

Figure 1:
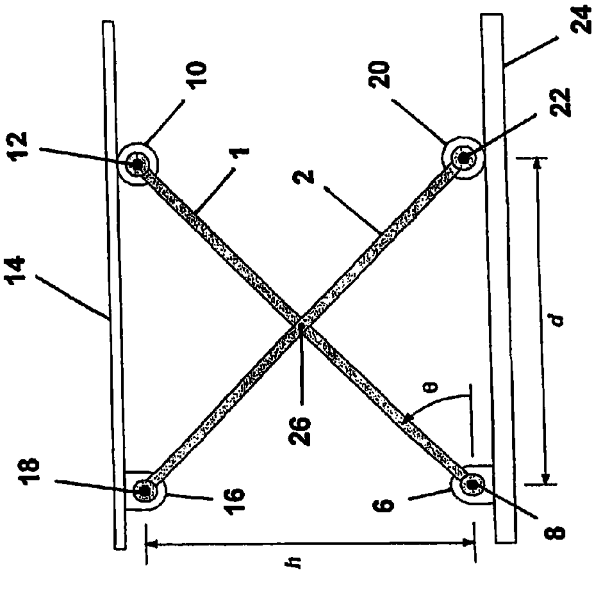
FIG. 1 is a diagram showing components and variables of a single-stage scissor linkage mechanism.

FIG. 1 is a diagram showing components and variables of a single-stage scissor linkage mechanism with one degree of freedom, which is driven by one or more actuators (not shown). This scissor linkage mechanism comprises a pair of links 1 and 2 having the same length. Links 1 and 2 are pivotably coupled to each other at a pivot point 26 (e.g., a pin joint) midway along the lengths of the links. (A pin joint is a one-degree-of-freedom kinematic pair used in mechanisms, and is also known as a revolute joint. Pin joints provide single-axis rotation.) One (lower) end of link 1 is pivotably coupled to a support block 6 at a pivot point 8 (e.g., a pin joint), and the other (upper) end of link 1 is pivotably coupled to a roller 10 by means of a pivot point 12 (e.g., an axle). The interaction of the roller 10 with platform 14 (as well as roller 20 with base 24) is equivalent to a one degree of freedom translational (prismatic) joint. The support block 6 is affixed to or integrally formed with a stationary base 24 to form a frame. The roller 10 may roll in and along a track (not shown) formed on or attached to a platform 14 which is vertically displaceable relative to base 24. One (upper) end of link 2 is pivotably coupled to a support block 16 (affixed to or integrally formed with platform 14) at a pivot point 18 (e.g., a pin joint), and the other (lower) end of link 2 is pivotably coupled to a roller 20 by means of a pivot point 22 (e.g., an axle). The roller 20 may roll in and along tracks (not shown) formed on or attached to base 24.

In this configuration, the actuator (not shown) causes orthogonal motion of the opposing ends of link 2. For example, for the measurement or lifting task that this scissor linkage mechanism is designed for, the upper end of link 2 and support block 16 will move vertically as the lower end of link 2 and roller 20 move horizontally. The coupling of the rollers and tracks may be designed so that the platform 14 moves vertically without rotation (i.e., only translates) during extension or retraction of the scissor linkage mechanism.

Although the position paths that both ends of link 2 take are both linear (i.e., straight line motions that are perfectly horizontal and perfectly vertical, respectively), the relative relationship between the input and output positions is not linear, and the relative relationship between the input and output and velocities is also not linear. This non-linear relationship between the inputs and outputs has an impact on the motion control of this system, which will be described in detail later.

FIG. 1 also indicates various dimensions, where d is the current distance between the axes of pivot points 8 and 22; h is the distance between the axes of pivot points 8 and 16; and 0 is the angle between a midline of link 1 and a line parallel to base 24 that intersects the axis of pivot point 8. Once the distance h is known, the height of the platform or an end effector mounted to the platform can be computed by adding the respective distance separating the platform or the end effector from pivot point 18.

Figure 2:
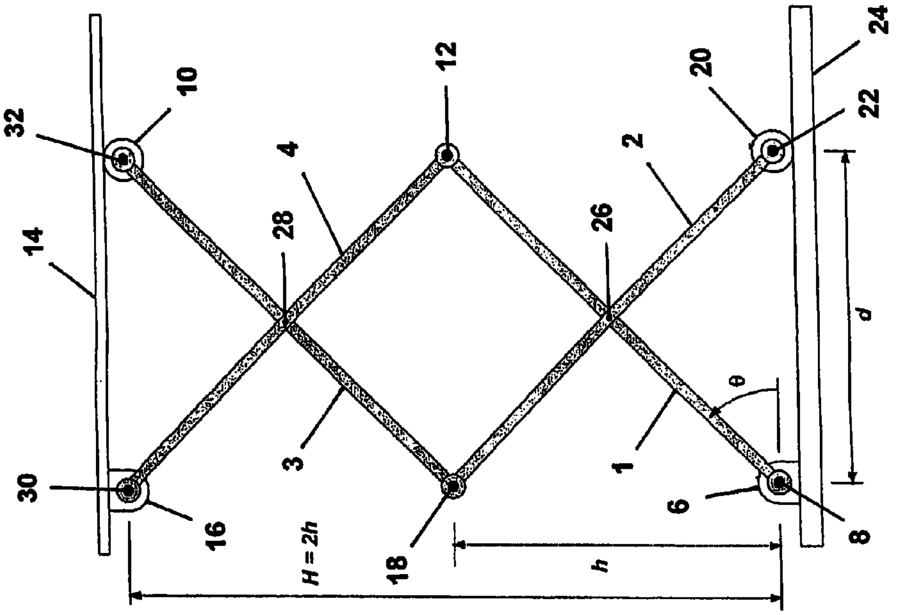
FIG. 2 is a diagram showing components and variables of a double-stage scissor linkage mechanism.

FIG. 2 is a diagram showing components and variables of a double-stage scissor linkage mechanism with one degree of freedom, which is driven by one or more actuators (not shown). This double-stage scissor linkage mechanism comprises four links 1-4 having the same length. Links 1 and 2 are pivotably coupled to each other at a pivot point 26 (e.g., a pin joint) midway along their lengths; links 3 and 4 are pivotably coupled to each other at a pivot point 28 (e.g., a pin joint)

midway along their lengths; One (lower) end of link 1 is pivotably coupled to a support block 6 (affixed to or integrally formed with a stationary base 24 to form a frame) at a pivot point 8 (e.g., a pin joint), and the other (upper) end of link 1 is pivotably coupled to one (lower) end of link 4 at a pivot point 12. The other (upper) end of link 4 is pivotably coupled to a support block 16 (affixed to or integrally formed with a platform 14) at a pivot point 30 (e.g., a pin joint). One (upper) end of link 2 is pivotably coupled to one (lower) end of link 3 at a pivot point 18 (e.g., a pin joint), and the other (lower) end of link 2 is pivotably coupled to a roller 20 by means of a pivot point 22 (e.g., an axle). The other (upper) end of link 3 is pivotably coupled to a roller 10 by means of a pivot point 32 (e.g., an axle).

FIG. 2 also indicates various dimensions, where d is the current distance between the axes of pivot points 8 and 22; h is the distance between the axes of pivot points 8 and 30; H (=2 h) is the distance between the axes of pivot points 8 and 18; and θ is the angle between a midline of link 1 and a line parallel to base 24 that intersects the axis of pivot point 8.

In operation, pivot point 22 is driven toward pivot point 8 to cause the scissor linkage to extend (and the platform 14 moves away from the base 24), and pivot point 22 is driven away from pivot point 8 to cause the linkage to retract (platform 14 moves toward base 24). This mechanism, regardless of the number of stages, has exactly one degree of freedom. Moving one part of the mechanism causes a deterministic movement of the entire mechanism. This input motion can be created by using an extending (i.e., linear) actuator such as a screw drive or hydraulic piston, or a rotational actuator coupled to one of the pivot points.

Figure 3:
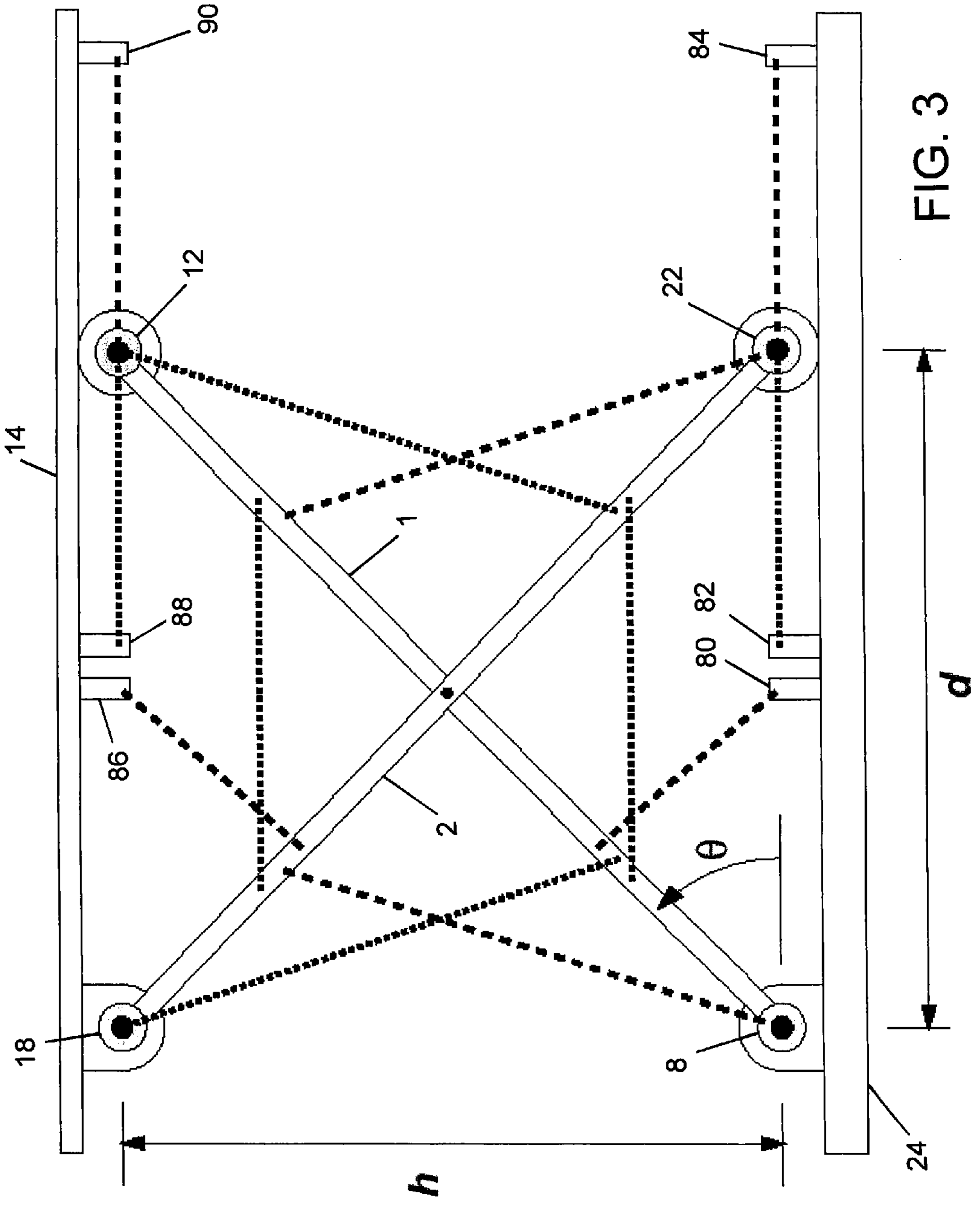
FIG. 3 is a diagram showing some possible actuator mounting arrangements for a single-stage scissor linkage mechanism of the type shown in FIG. 1.

FIG. 3 is a diagram showing some possible actuator mounting arrangements for a single-stage scissor linkage mechanism of the type shown in FIG. 1. Some possible extending actuator connections for a single-stage scissor mechanism (indicated by dashed lines in FIG. 3) include: pivot point 22 to a support block 82 or 84 attached to base 24; link 1 to a support block 80 attached to base 24; link 1 to link 2, pivot point 12 to a support block 88 or 90 attached to platform 14; and link 2 to a support block 86 attached to platform 14. Some possible rotational actuator connections (not shown in FIG. 3) include: pivot point 8 to base 24, link 1 to link 2, and pivot point 18 to platform 14.

Figure 4:
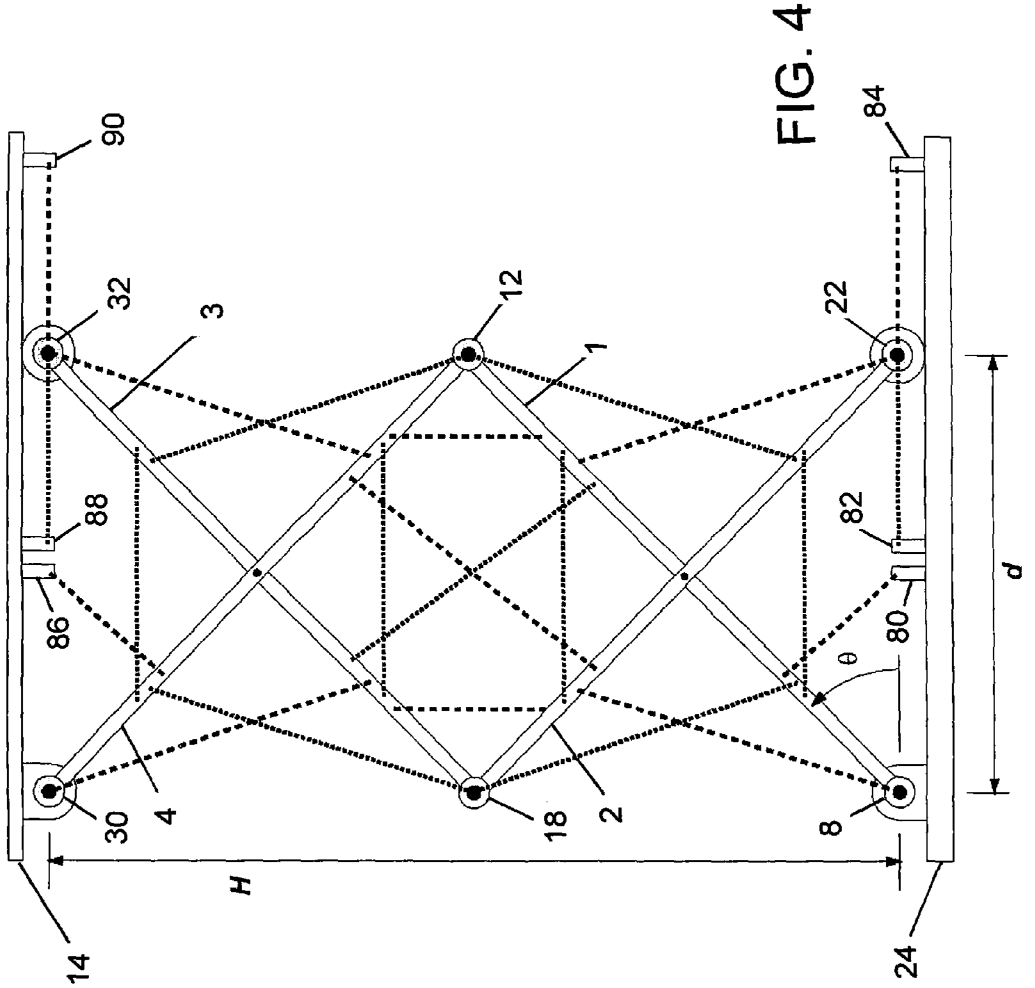
FIG. 4 is a diagram showing some possible actuator mounting arrangements for a multi-stage scissor linkage mechanism of the type shown in FIG. 2.

FIG. 4 is a diagram showing some possible actuator mounting arrangements for a multi-stage scissor linkage mechanism of the type shown in FIG. 2. For multiple-stage scissor mechanisms, extending actuators may be connected as in the single-stage mechanism, and they may also be connected between parallel links, such as between link 1 and link 3 and between link 2 and link 4. Other actuator locations are also possible, such as between link 1 and link 4. The choice is usually dependent on where the actuators will fit in the specific design of the mechanism. A scissor linkage mechanism may use multiple actuators to move in cases where additional force is needed, but these actuators need to be moved at the same time, since they are still controlling only one degree of freedom. In some scissor linkage designs the actuator may be installed so that actuator extension causes platform to extend (move away from the base), while in other scissor linkage designs, the actuator may be configured to retract to cause extension of the platform.

Figure 5:
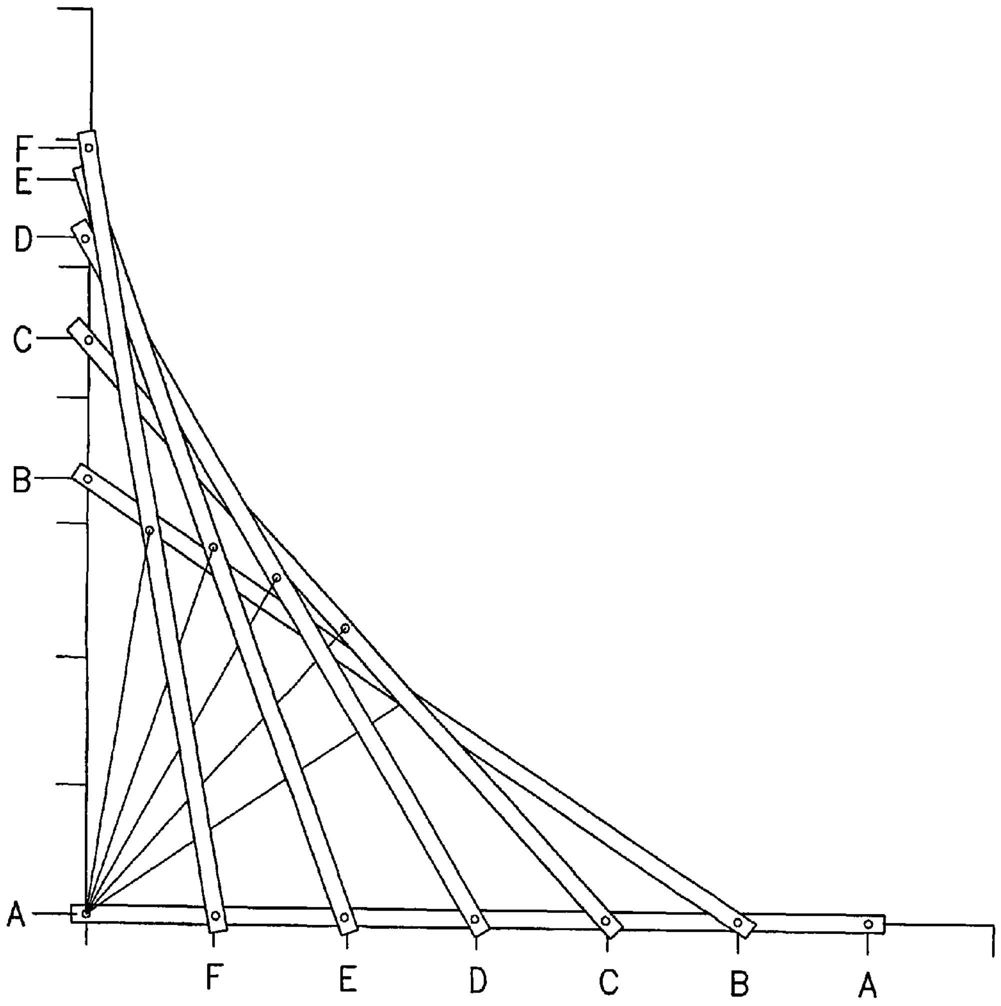
FIG. 5 is a diagram showing intermediate positions of link 2 shown in FIG. 1.
Figure 6:
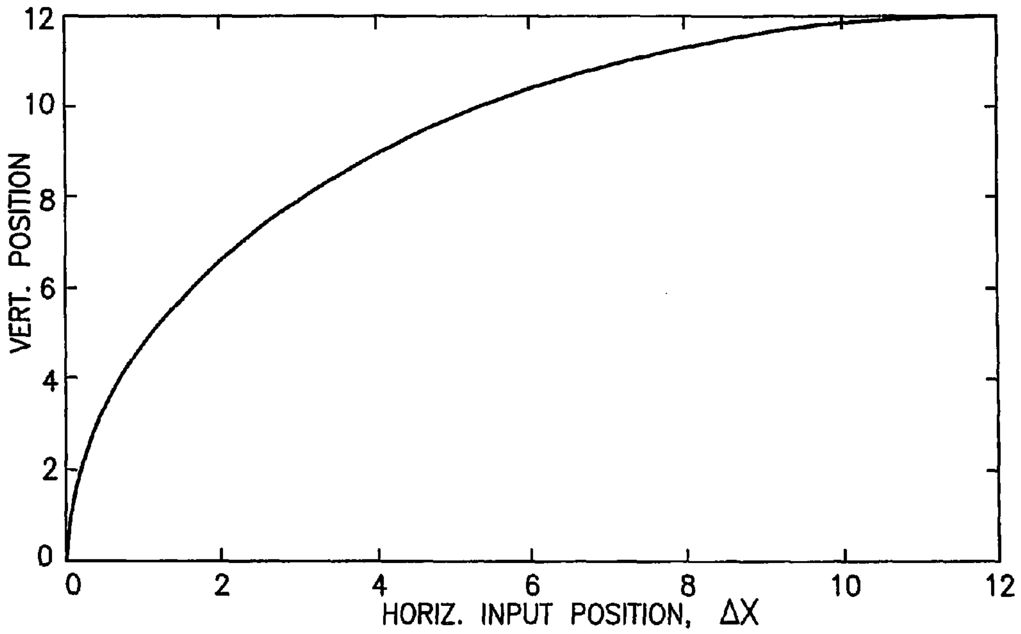
FIGS. 6 and 7 are graphs that respectively plot platform (or end effector) position and velocity versus horizontal input position for a single-stage modified scissor lift mechanism.
Figure 7:
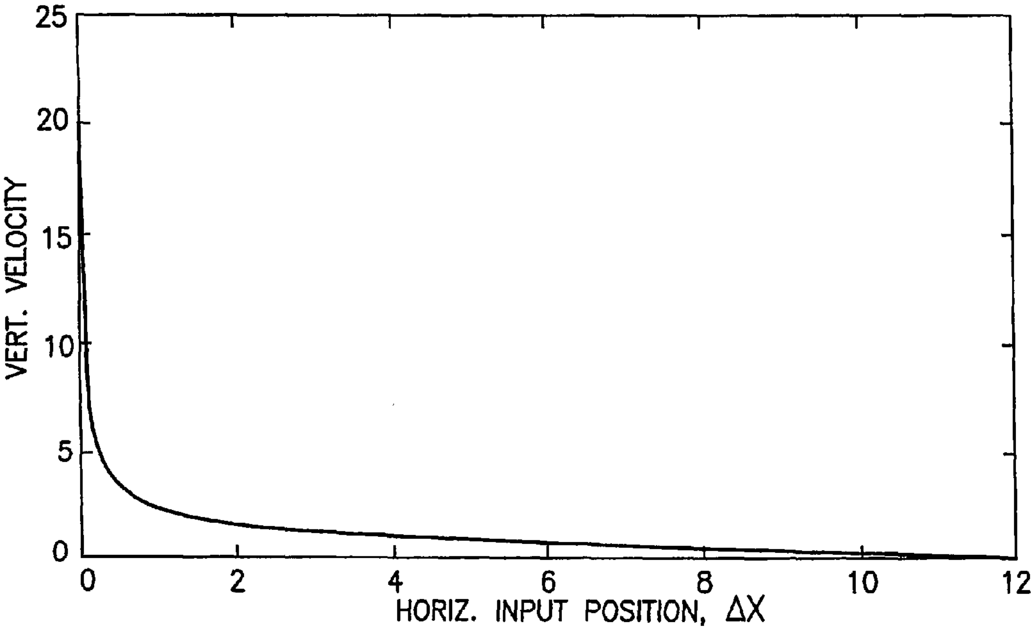

FIG. 5 shows multiple intermediate positions of a link (e.g., link 2 in FIG. 1) as it is moved though its range of motion. The labeled positions (A, B, C, etc.) on the input end of the link, shown on the horizontal axis, correspond to the same labels for positions on the output (vertical) axis. Notice that the spacing on the input axis is uniform, but is non-uniform on the output axis. This non-linear relationship is also shown in the position and velocity plots in FIGS. 6 and 7 respectively. More specifically, FIG. 6 is a plot of the vertical position of the output end of a drive link versus the horizontal position of the input end of the drive link; while FIG. 7 is a plot of the vertical velocity of the output end of the drive link versus the horizontal position of the input end of the drive link for a constant horizontal velocity of the input end of the drive link.

Since the vertical output motion (position and velocity) of the drive link is not proportional to the horizontal input motion (i.e., non-linear) of the drive link, the control of the output position is not as simple as, for example, just counting the rotations of a lead screw and applying a scale factor. In order to move the output end of the drive link vertically to a precise position during extension or retraction of a scissor linkage mechanism, a more complex control method is needed.

Figure 8:
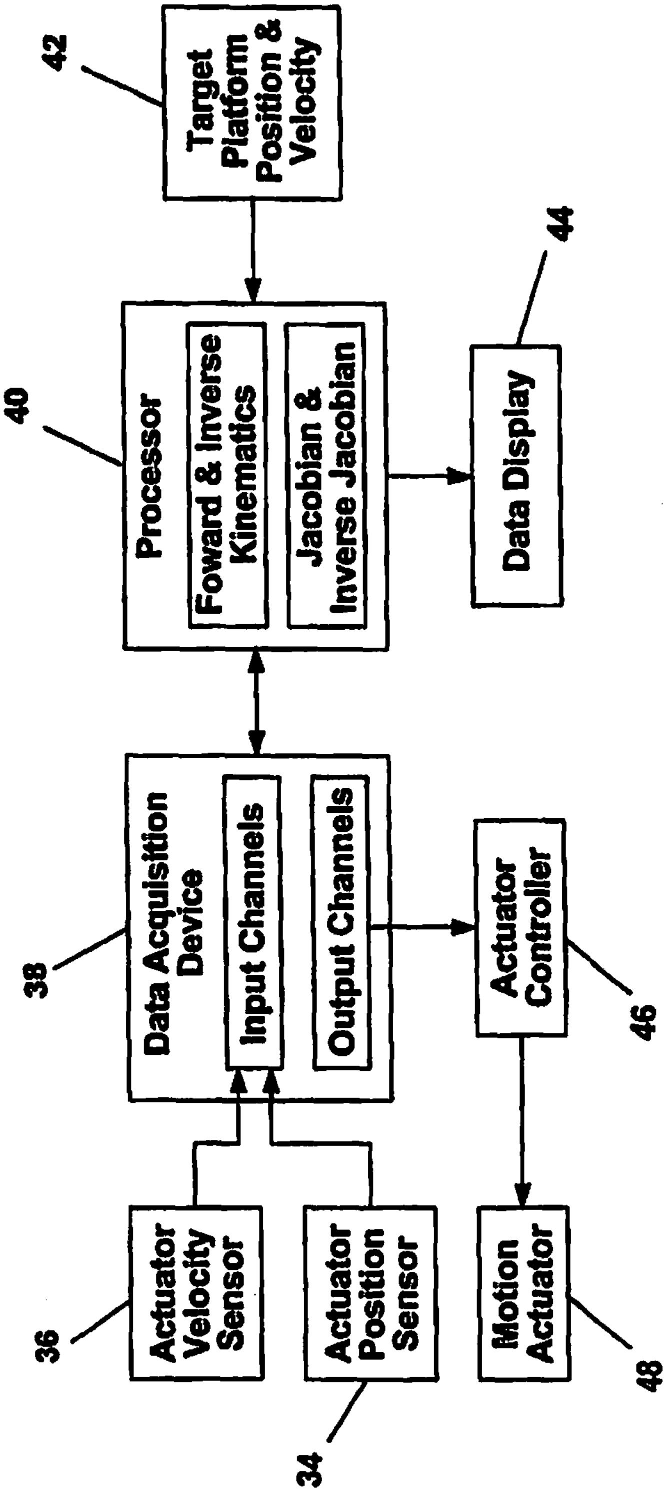
FIG. 8 is a block diagram showing a system for measuring and controlling the extension of a scissor linkage mechanism in accordance with one embodiment.

One embodiment of a system for measurement and controlling the extension of scissor linkage mechanisms (such as those shown in FIGS. 1 and 2) is diagrammatically depicted in FIG. 8. The depicted system comprises a motion actuator 48, an actuator position sensor 34 (e.g., an encoder or a potentiometer) and an actuator velocity sensor 36 (e.g., a tachometer) mounted to the motion actuator 48, an actuator (i.e., motion) controller 46 which controls the operation of motion actuator 48, a processor 40 running measurement software with a conversion algorithm (described in detail below), and a data acquisition device 38 that reads the sensor data from the aforementioned sensors and provides a communication pathway between the processor 40 and the actuator controller 46. Each of data acquisition device 38, processor 40 and actuator controller 46 may comprise a respective processing unit (e.g., a microprocessor or a central processing unit) and a respective memory or other computer-readable medium.

In accordance with the embodiments disclosed herein, the motion actuator is arranged to cause the platform of a scissor linkage system to displace relative to a stationary base of the scissor linkage system. During operation of the scissor linkage system, actuator position sensor 34 can output data representing the position of the motion actuator 48 to the data acquisition device 38, while actuator velocity sensor 36 can output data representing the velocity of the motion actuator 48 (e.g., the velocity ii) to the data acquisition device 38. Data from the sensors is received by the input channels of the data acquisition device 38.

The distance d (see FIGS. 1 and 2) can be computed by the processor 40 based on the actuator position data provided by actuator position sensor 34; likewise the velocity a can be computed by processor 40 based on the actuator velocity data provided by actuator velocity sensor 36. The position and velocity data of the platform can be displayed on a data display device 44 to provide the user with improved situational awareness information. Conversely, the processor 40 can also be programmed to compute target actuator position and velocity based on target platform position and velocity 42. The target platform position and velocity 42 can be input to processor 40 by means of a conventional user interface. The data acquisition device outputs commands (see arrow from block labeled "Output Channels" in FIG. 8) to the actuator controller to achieve the target actuator position and velocity.

The data acquisition device 38 can receive any of the following types of digital or analog inputs: (a) encoder pulses from rotational encoders (angle) or linear encoders (position); (b) pulses from a digital tachometer (rotational velocity); (c) analog inputs from a potentiometer (for angle or position); and (d) analog inputs from an analog tachometer (rotational velocity).

The data acquisition device 38 sends data through API function calls to the processor 40. In accordance with one implementation, the data acquisition device may be a USB4 encoder data acquisition USB device commercially available from US Digital, Vancouver, Wash. In this implementation, the data acquisition device 38 sends the data through a USB interface (over a USB cable), but other data acquisition devices may use other communications interfaces (e.g., a PCI slot inside the computer, a serial communications interface, Express Card, PCMCIA, or an Ethernet interface).

The signals that the data acquisition device 38 sends to the application running on the processor 40 are converted forms of the data from actuator position sensor 34 and actuator velocity data 36. Typically, this means conversion into data packets that are sent over the communication interface to the processor 40 and converted into integers or floating point numbers by the API. The application running on the processor 40 makes a request for data from the data acquisition device 38 and gets back integers or floating point numbers (for example, for an encoder, the application would request the current number of counts for a specific encoder and get back an integer representing the number of counts in the memory register in data acquisition device 38 that is associated with that encoder).

The processor 40 can also request that the data acquisition device 38 generate electrical signals in the forms of voltages. These electrical signals are then sent to other devices, such as the on-board actuator controller 46 of the scissor linkage system. These electrical signals can be in the form of timed pulses at a specific voltage (digital signals), or signals at a variable voltage (analog signals). The specific form of the output signals generated by the data acquisition device 38 in response to a request from the processor 40 depends on the requirements of the device that is receiving the signals. For example, if the actuator controller 46 expects pulses from an encoder, the application running on the processor 40 can be programmed to compute the number and frequency of the pulses required, and then request that the data acquisition device 38 send out simulated encoder pulses in terms of high and low electrical voltages.

The pertinent equations of motion for scissor linkages will be described below with reference to FIGS. 1 and 2.

Forward and Inverse Kinematic Positioning:

To mathematically describe the relationship between the input and output motions, non-linear transfer functions need to be developed. Not only should the vertical motion of the payload platform be described in terms of the actuator motion; the inverse function which describes actuator motion in terms of the vertical position of the payload platform should also be formulated. In robotics applications, the transfer function defining the output position in terms of input position is usually called forward kinematics, while defining the input position in terms of the output is called inverse kinematics.

Velocity Control

Some types of actuator (i.e., motion) controllers may have a way to receive velocity or rate inputs. This input data may come from sensors such as a digital tachometer (which measures rotational velocity). That velocity data would then be used by the actuator controller to control the motion actuator. In these systems, the goal of the actuator controller would be to maintain a desired platform velocity. But because of the non-linear kinematics of scissor linkage mechanisms, a constant vertical motion of the platform will not correspond to the controlled actuator moving at a constant velocity (see FIG. 7). Using a velocity computation method that will be described later, the required variable velocity of the motion actuator 48 can be computed (by the processor 40) and sent (by the data acquisition device 38) to the actuator controller 46 so that the platform moves at a constant velocity.

An embodiment in which a lead screw serves as a rotating actuator for a scissor linkage mechanism (see FIG. 11) is described in detail in U.S. patent application Ser. No. 13/470,125. In that embodiment, the kinematic equations of motion for a scissor linkage provide the non-linear relationship between the horizontal displacement created by the rotation of the lead screw motor and the desired height of the payload. From this relationship the number of turns of the lead screw can be computed to achieve the required height of the payload. At the same time, simulated encoder pulses corresponding to the vertical displacement of the platform can be generated by the data acquisition device and transmitted to the actuator controller.

One option for controlling the number of rotations of the lead screw motor for vertical motion uses an external encoder attached to the motor shaft (which is coupled to the lead screw). In accordance with this option, the actuator position sensor 34 (see FIG. 8) takes the form of an encoder that is coupled to a stepper motor shaft in such a way that the encoder generates a pulse for each unit rotation (i.e., a specified number of degrees or fraction of a degree) of the shaft. The processor 40 does not read the encoder data itself (since it may not be using a real-time operating system and could miss counts); instead the encoder data is read by the real-time data acquisition device 38, which can then be sent over a serial-type of interface (RS232/422) to processor 40. In this implementation, the processor 40 runs a software application that takes the input signals and uses the mechanism kinematics equations to instruct the data acquisition device 38 to generate output quadrature pulses that are identical in form to what an encoder would produce. These simulated quadrature pulses (which represent incremental vertical movements of the platform) are output by the data acquisition device 38 and sent to the actuator controller 46. The actuator controller 46 treats those simulated quadrature encoder pulses as if they were pulses from a physical vertical position encoder. With this type of arrangement, the current height of the platform (item 14 in FIGS. 1 and 2) is continuously synchronized with the simulated encoder pulses.

In addition to providing position pulses (to simulate an encoder), the data acquisition device 38 can also be set up to provide pulse data to mimic the inputs to a digital tachometer. For example, some actuator controllers may use tachometer inputs, such as signals generated by a Hall effect sensor, to measure the rotating speed of an actuator input shaft (such as the shaft of a lead screw or ball screw mechanism). The Hall effect sensor creates a change in output voltage in the presence of a magnetic field. In a typical configuration for measuring rotational velocity, one or more magnets are attached to a rotating shaft so that they pass by the Hall effect sensor as the shaft rotates. This creates a series of voltage pulses. The frequency of the pulses is measured and used to determine the rotational velocity. As long as the voltage and duration of the pulses matches the input requirements of the actuator controller 46, the actuator controller will not be able to distinguish between pulses created by a Hall effect sensor and pulses generated by the data acquisition device 38. This is the process that enables the transfer of velocity data by the method described here. In this case, scissor-lift velocity data (derived from a Jacobian computation discussed in the next section) can be converted into a pulse format generated by the data acquisition device 48 and then transmitted to the actuator controller 46.

Equation Development

The equations that describe the relationship between the inputs and outputs will be presented below. These are programmed in software on the processor 40 shown in FIG. 8.

A closed-form derivation of the position and velocity equations has been developed for scissor linkage mechanisms, which allows continuous computation of the platform position and velocity based on actuator measurements. A closed-form solution for the reverse (i.e., inverse) formulation has also been developed that allows determination of the actuator position and velocity based on the target platform position and velocity.

From knowledge of the scissor linkage mechanism, it can be understood that the input drive motion and output vertical position form the sides of a right triangle. The relationship between the sides of a right triangle is described by the Pythagorean Theorem: $a^2+b^2=c^2$. This equation is the basis for one form of the derivation. Another approach is to use trigonometry involving the link lengths and angles.

Due to the fact that there are so many possible configurations for actuator connections on a scissor linkage mechanism, it is useful to describe the position and velocity equations of motion in general forms that can be applied for any actuator configuration with any number of stages. For this derivation, two separate sets of equivalent equations will be given below: one set involving the use of the linear variable d as the input (with the derivation based on the Pythagorean Theorem), and the other set using the rotational variable θ as the input (with the derivation based on trigonometry). Either form can be used for any scissor linkage mechanism. To use these equations with different configurations, all that is needed is to represent the actuator motion in terms of variable d or variable θ. Both derivations will be described below.

Derivation in Terms of Distance d:

The first step is to find the required input as a function of the desired extension position. In robotics applications this is usually referred to as inverse kinematics. The general form of an inverse kinematics equation is $\Theta=f(X)$, where $\Theta$ is the vector of unknown inputs variable and X is the vector of desired goal position. For the setup shown in FIG. 1, the unknown is a single variable d and the goal is h.

As previously discussed, the drive motion and output vertical position form the sides of a right triangle, the relationship between sides of respective lengths a and b and a hypotenuse of length c being $a^2+b^2=c^2$. In the situation under discussion, a is the distance d between the two lower pivot points 8 and 22; b is the height of the payload platform h; and c is the length L of the drive link (i.e., link 1 in FIG. 1). Using this relationship, the inverse kinematics equation (with the variable names from FIG. 1) is:

$$d=\sqrt{L^2-h^2} \tag{1}$$

The processor can employ Eq. (1) to calculate the target actuator position that corresponds to a target height of a platform. After the target actuator position has been computed, the processor requests that the data acquisition device command the actuator controller to control the actuator to move to the target actuator position.

Conversely, the forward kinematics equation is:

$$h=\sqrt{L^2-d^2} \tag{2}$$

During extension (or retraction) of the scissor linkage mechanism, the processor can employ Eq. (2) to repeatedly calculate the current height of the platform (or end effector mounted thereto) based on the actuator position sensor feedback provided via the data acquisition device. After the current height has been computed, the processor can compare the current height to the target height and, when the current height equals the target height, request the data acquisition device to command the actuator controller to cease actuation, thereby stopping extension (or retraction) of the scissor linkage mechanism. Other control schemes (such as proportional feedback control) may also be used.

Velocities of the payload platform and the motion actuator will also need to be addressed. For these calculations, a Jacobian-based solution will be used. The Jacobian (or Jacobian matrix) is a representation of all the first-order partial derivatives of a function. In robotics and mechanism analysis, the Jacobian allows the velocities defined in terms of one set of variables to be represented in terms of another set of variables. For the scissor linkage mechanism, the Jacobian will allow the conversion of actuator velocities into platform velocities. The general form of the Jacobian equation is $\dot{X}=J(\Theta)\dot{\Theta}$, and for this system the Jacobian equation can be represented as $\dot{h}=J(d)\dot{d}$. Substituting the variables listed above, the Jacobian equation becomes:

$$\dot{h}=-\frac{d}{\sqrt{L^2-d^2}}\dot{d} \tag{3}$$

During extension (or retraction) of the scissor linkage mechanism, the processor can employ Eq. (3) to repeatedly calculate the current velocity of a platform (or an end effector mounted thereto) based on the actuator velocity sensor feedback provided via the data acquisition device. After the current velocity of the platform has been computed, the processor can compare the current velocity to a target velocity of the platform and then request the data acquisition device to command the actuator controller to adjust the actuator velocity as needed to maintain a current velocity of the platform equal to the target velocity during extension (or retraction).

The general form of the inverse Jacobian equation is $\Theta=J^{-1}(\Theta)\dot{X}$, and for this system the inverse Jacobian can be represented as $\dot{d}=J^{-1}(d)\dot{h}$. Substituting the variables listed above, the inverse Jacobian equation becomes:

$$\dot{d}=-\frac{\sqrt{L^2-d^2}}{d}\dot{h} \tag{4}$$

As the mechanism is moving, the processor can employ Eq. (4) to repeatedly calculate a target actuator velocity that corresponds to a target velocity of the platform (or an end effector). This process happens once for each update cycle; and for a typical implementation, there will be multiple cycle updates per second. During each update cycle, after the target actuator velocity has been computed, the processor can request that the data acquisition device command the actuator controller to control the actuator to achieve the variable target actuator velocity required to maintain a constant target velocity of the platform.

Additional information about Jacobian matrices can be found in robotics textbooks, such as "Introduction to Robotics: Mechanics and Control" by J. Craig.

For the general case for a scissor linkage mechanism with any number of stages, the resulting equations are:

$$h = n\sqrt{L^2 - d^2} \tag{5}$$

$$d = \sqrt{L^2 - (h/n)^2} \tag{6}$$

$$\dot{h} = -\frac{d}{\sqrt{L^2 - d^2}} n\dot{d} \tag{7}$$

$$\dot{d} = -\frac{\sqrt{L^2 - d^2}}{d} n\dot{h} \tag{8}$$

where n is the number of scissor stages (e.g., n=2 for the linkage shown in FIG. 2).

To use the foregoing equations for configurations where the actuator is not connected between pivot point 8 and base 24, additional equations can be defined to describe the results in terms of d and a.

Derivation in Terms of Angle θ:

As mentioned earlier, for some configurations of scissor linkage actuators, it may be preferable to work with the equations of motion derived in terms of the angle θ (shown in FIGS. 1 and 2) Note that the following equations are equivalent to the ones described above, and the resulting motion is the same.

The equations of motion for the general case of configurations with any number n of scissor stages are as follows:

$$h = nL\sin(\theta) \tag{9}$$

$$\theta = \sin^{-1}\left(\frac{h}{nL}\right) \tag{10}$$

$$\dot{h} = nL\dot{\theta}\cos(\theta) \tag{11}$$

$$\dot{\theta} = \frac{\dot{h}}{nL\cos(\theta)} \tag{12}$$

To use these equations for configurations where the actuator is not connected between pivot point 8 and base 24, additional equations can be defined to describe the results in terms of θ and $\dot{\theta}$.

Figure 9:
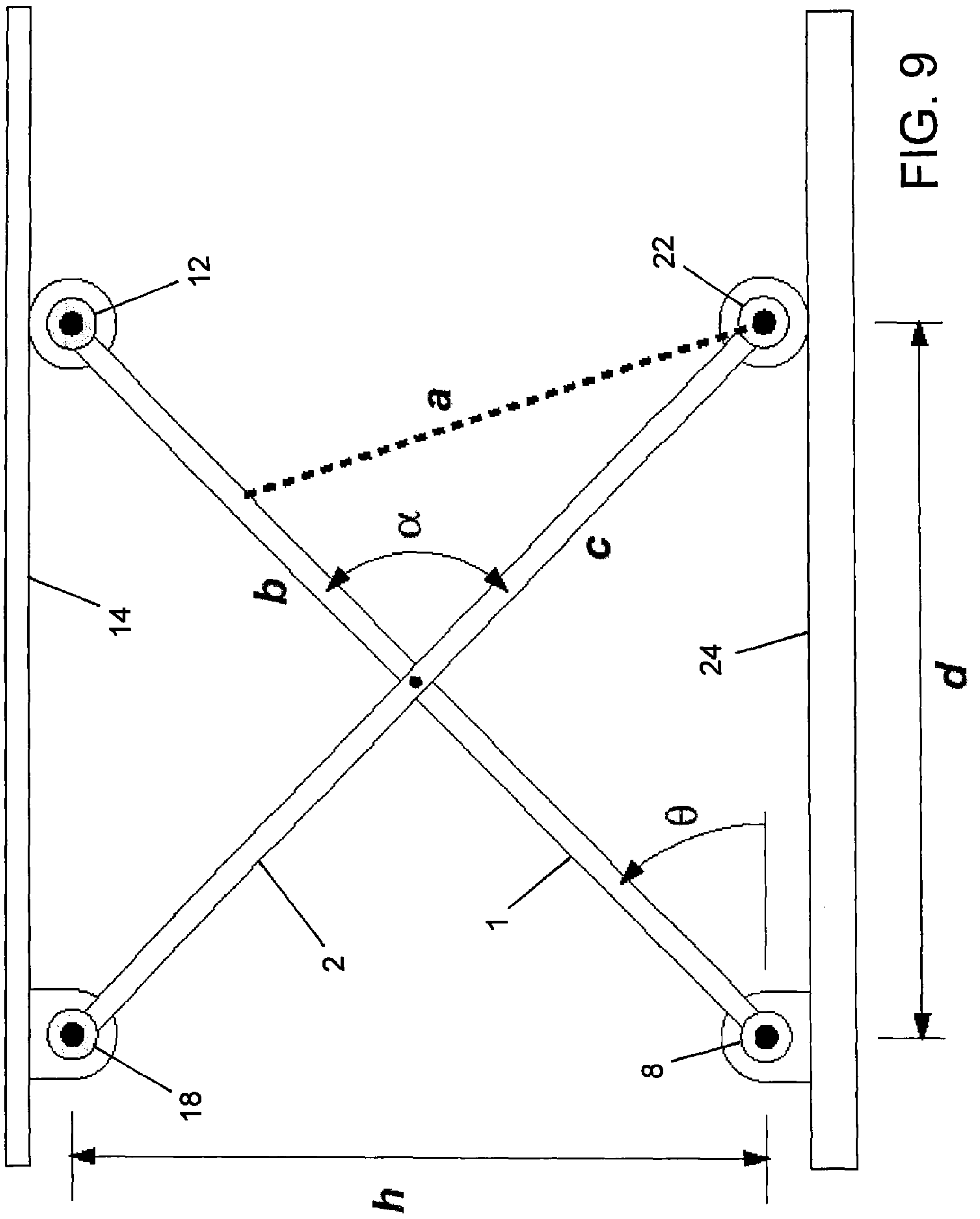

For example, FIG. 9 shows a common configuration with an actuator of length a. In this configuration, angle α can be computed using trigonometry, specifically, using the Law of Cosines: $a^2=b^2+c^2-2\,ab\cos(\alpha)$. In this arrangement, angle θ is half of angle α. After substituting θ=α/2, the resulting equations for this configuration are:

$$\theta = \frac{1}{2}\arccos\left(\frac{b^2 + c^2 - a^2}{2bc}\right) \tag{13}$$

$$\dot{\theta} = \frac{\dot{a}}{bc\sqrt{4 - \frac{(b^2 + c^2 - a^2)^2}{b^2c^2}}} \tag{14}$$

Figure 10:
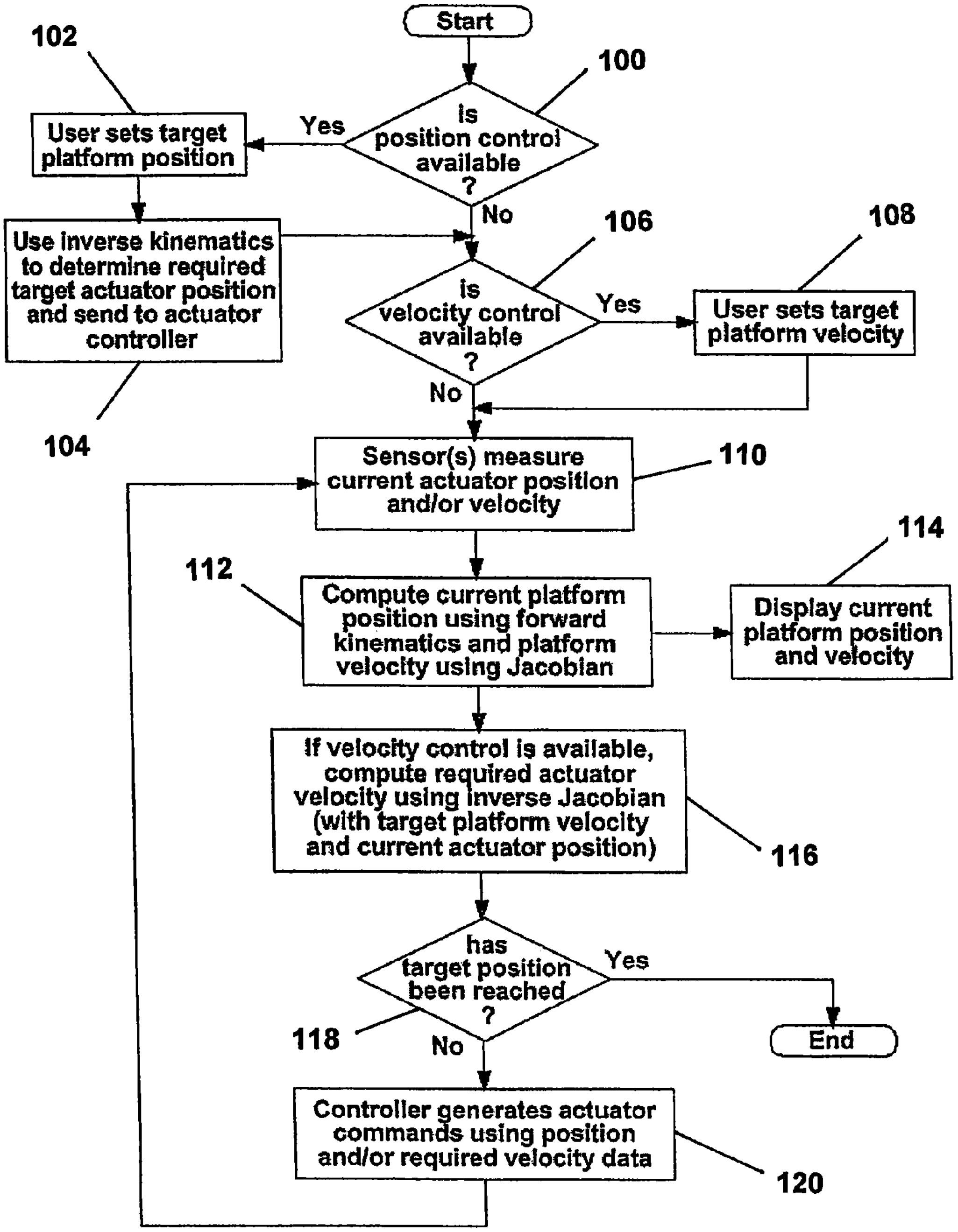
FIG. 10 is a flowchart showing a process for measuring and controlling the extension of a scissor linkage mechanism in accordance with one embodiment.

FIG. 10 shows a process for measuring and controlling the extension of a scissor linkage mechanism in accordance with one embodiment. This process requires either actuator position control or actuator velocity control.

In accordance with the process depicted in FIG. 10, the user first determines whether position control is available (step 100). This type of system includes some form of actuator position measurement (such as a linear or rotational encoder). If position control is available, then the user sets a target position for the platform (or end effector) (step 102). Then the processor uses an inverse kinetics equation (e.g., one of Eqs. (1), (6) and (10)) to determine a required target actuator position and requests that the data acquisition device send the required target actuator position in a format acceptable to the actuator controller (step 104).

The user also determines whether velocity control is available (step 106). This type of system includes some form of actuator velocity measurement (such as a tachometer or numerical differentiation of position data measured by a position encoder). If the user determined in step 100 that position control is available, then step 106 is performed after step 104 is performed; if the user determined in step 100 that position control is not available, then steps 102 and 104 are not performed and step 106 is performed after step 100.

If the user determines that velocity control is available, then the user sets a target velocity for the platform (or end effector) (step 108). If the user determines that velocity control is not available, then the user does not perform step 108.

For the purpose of discussing FIG. 10, it will be assumed that both position control and velocity control are available and that the user has set both the target position (step 102) and target velocity (step 108) of the platform (or end effector). Now the automated process of extending or retracting the scissor linkage mechanism can be initiated by the user. Upon initiation of the feedback control loop part of the process the sensors start to measure the current actuator position and current actuator velocity (step 110), outputting actuator position and velocity data to the data acquisition device. The data acquisition device provides the sensor data to the processor in response to requests from the latter. Using that sensor data received from the data acquisition device, the processor computes the current platform position using a forward kinetics equation (e.g., one of Eqs. (2), (5) and (9)) and computes the current platform velocity using a Jacobian equation (e.g., one of Eqs. (3), (7) and (11)) (steps 112). The processor sends the results of those computations to the display device for display (step 114).

If velocity control is available, the processor computes the required target actuator velocity using an inverse Jacobian equation having the target platform velocity and current actuator position as input variables (e.g., one of Eqs. (4), (8) and (12)) (step 116).

The processor then compares the current platform position with the target platform position and determines whether the target platform position has been reached (step 118). If the platform has reached its target position, the actuator motion is stopped and the process is terminated. If the platform has not reached its target position, the actuator controller generates actuator commands using the required target actuator position and velocity received from the data acquisition device (step 120). Then the process loops back to step 110. Steps 120, 110, 112, 116 and 118 are repeated until the processor determines in step 118 that the target platform position has been reached. Then the process is terminated and the actuator motion is stopped as previously described.

Other feedback control processes may also be used in the update loop to achieve similar results. For example, proportional-integral-derivative (PID) control may be implemented using position sensors and/or velocity sensors. Other embodiments may include other control methods to allow for specific velocity and acceleration profiles, such as gradual acceleration and deceleration at the start and end of a move to a specific platform position, or during the initial and ending phases of a sequence for moving at a specific platform velocity.

For many types of scissor linkage systems, a position encoder can be attached to an extending actuator, such as a hydraulic, pneumatic, or motor-driven extending actuator, or a rotating actuator, such as the lead screw-based drive system described in U.S. patent application Ser. No. 13/470,125. Applying the measurement and control processes described herein to these application areas would enable automation, as well as more precise types of manual control.

Figure 11:
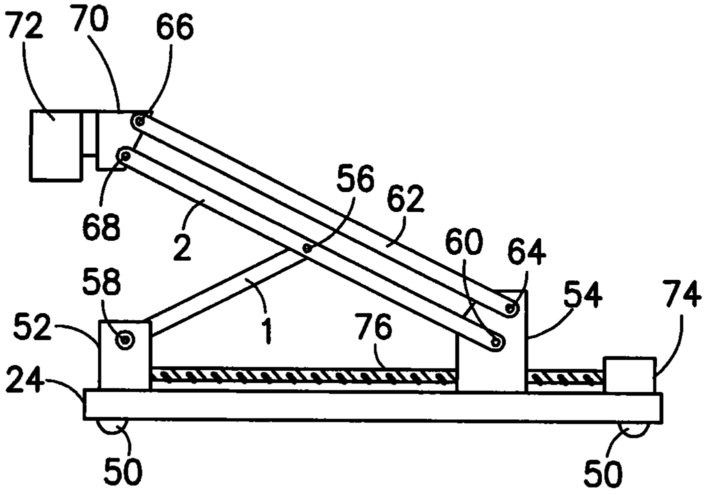
FIG. 11 is a side view showing one embodiment of a mobile single-stage scissor linkage system capable of raising and lowering an end effector in accordance with the teachings herein.

FIG. 11 is a side view showing one embodiment of a mobile scissor lift device capable of raising and lowering an end effector 72 in accordance with the teachings herein. As seen in FIG. 11, the lift device has a single-stage scissor linkage mechanism mounted on a base 24 which rolls on wheels 50 (only two of which are visible in FIG. 11). The scissor linkage mechanism is driven to extend or retract in response to rotation of a lead screw 76. Rotation of lead screw 76 is driven by a programmable stepper motor 74. The end effector 72 is mounted to a payload platform 70 which is coupled to and supported by the scissor linkage mechanism.

The scissor lift device shown in FIG. 11 comprises a support block 52 mounted to or integrally formed with base 24 to form a frame and a translatable (relative to base 24) support block 54 (hereinafter "slider mechanism") that is movable relative to the frame. The lead screw 76 has a distal end rotatably coupled to support block 52 and an intermediate portion rotatably coupled to slider mechanism 54 by a nut (not shown), which is attached to the slider mechanism. The stepper motor 74 is mounted to base 24. An output shaft (not shown) of stepper motor 74 is coupled to the other end of lead screw 76. The slider mechanism 54 is put into motion by means of the lead screw 76 and stepper motor 74.

The scissor linkage mechanism seen in FIG. 11 further comprises one link 1 having a length half that of another link 2. Link 1 is attached to a pivot point 56 midway along the length of the longer link 2, which will be referred to hereinafter as the "drive link". The other end of the shorter link 1 is pivotably coupled to a support block 52 by a pivot point 58, and one end (referred to herein as the proximal end) of the drive link 2 is pivotably coupled to slider mechanism 54 through a pivot point 60. The slider mechanism 54 moves pivot point 60 towards or away from pivot point 58. The motion path of slider mechanism 54 is a straight line defined by the axis of lead screw 76. In this configuration, the motion of the proximal end of drive link 2 causes orthogonal motion of its other end (referred to as the distal end) relative to the motion of the slider mechanism 54. For the task that the system shown in FIG. 11 has been designed for, the proximal end of the drive link 2 moves horizontally while the distal end moves vertically when the lead screw is rotated. Although the position paths that both the proximal and distal ends of the drive link 2 take are both linear (i.e., moving in straight lines, perfectly horizontal and perfectly vertical, respectively), the relative relationship between input and output velocities is not linear.

In addition to links 1 and 2 of the single-stage scissor linkage mechanism shown in FIG. 11, a follower link 62, of equal length to drive link 2, is used to form a four-bar parallelogram linkage with the drive link 2 as one of the links. The follower link 62 allows the system to maintain a constant orientation of the payload platform 70 located at the distal end of drive link 2. Follower link 62 is pivotably coupled to slider mechanism 54 by a pivot point 64. The payload platform 70 is pivotably coupled to the distal ends of links 2 and 62 by respective pin points 68 and 66. During operation, as the proximal end of drive link 2 is driven by lead screw 76 from one end point of travel to the other, the payload platform motion will always stay perpendicular to the lead screw 76 and the orientation will stay constant. In other words, as slider mechanism 54 is moved toward support block 52, end effector 72 moves up along a vertical path without rotating. In the current implementation of this design, the lead screw 76 is installed in parallel with the base 24, resulting in motion of the end effector 72 being perpendicular to the base 24, which itself rides on wheels 50.

Although not shown in FIG. 11, the stepper motor 74 is connected via an electrical cable to a data acquisition device of the type previously described with reference to FIG. 8. In accordance with one implementation, the end effector 72 can be raised or lowered relative to the base under the control of a processor. The stepper motor 74 can receive commands from that processor via the data acquisition device in accordance with the process previously described with reference to FIG. 10. In addition, the same processor (or a different processor) may be programmed to control another motor (not shown in FIG. 11) that causes the base 24 (and the entire vehicle) to move horizontally while the scissor lift mechanism positions the end effector 72 vertically to perform its function.

The above-described system can be utilized to position an end effector (e.g., a non-destructive inspection (NDI) unit) at specific locations while moving the end effector at specified velocities. In addition to NDI-specific types of inspection, other types of inspection or manufacturing applications may be able to take advantage of the mechanical and control concepts presented here. For example, the end effector 72 may be a laser scanner, video camera, robotic manipulator, reflective target, paint head, or other electro-mechanical component. To achieve the foregoing, motion control and position measurement processes must be implemented in software using available motor control interfaces and knowledge about the kinematics of the scissor linkage mechanism.

For the purpose of illustration, operation of an automated end effector-carrying scissor linkage mechanism driven by a lead screw-based drive system (e.g., comprising a lead screw driven by a stepper motor) and controlled by a processor will now be described. In accordance with one embodiment, a motion plan can be loaded into a control software application that runs on the processor. Prior to operation of the scissor linkage system, a vertical height calibration (discussed later) should be performed. During operation, if the motion control process determines that the end effector should be moved vertically, the target vertical position is converted into a lift motor rotation count using inverse kinematic equations. Then the rotation value and a start signal are sent to the lifting motor. During vertical motion, the motion control process determines whether the target vertical position has been reached. If the position is not achieved, a warning may be displayed on the display device and the actual vertical position of a specified point on the modified scissor linkage mechanism (e.g., a pivot joint axis) is computed.

For controlling the vertical position of the end effector in the above-described system, the standard position control available from a stepper motor control interface can be used, with the addition of a final position check to make sure that the number of lead screw rotations requested by the processor was completed. For vertical motion the number of rotations needed is not a direct linear function of the height, so the inverse kinematics equations of motion described earlier are used to compute the required number of motor turns needed to achieve the desired height.

To ensure that the system produces accurate vertical positions, it first must be calibrated. Since the system uses a rotational encoder, an absolute number of rotations from zero is not available unless a starting rotation value is set based on a known position of some part of the system. From a kinematics point of view, the simplest zero point would be when the mechanism is fully collapsed. But this configuration is problematic, since it would not be possible to extend the mechanism when all of the links are parallel (which would require infinite force), and for some component layouts, it is not possible to have all of the links in parallel. For these reasons, the system has an initialization point somewhere other than the zero vertical position.

To calibrate the system with a kinematically non-zero location, a switch (e.g., a Hall effect sensor) can be used to indicate when the upper end of the drive link (e.g., link 2 in FIG. 1) has reached a known vertical position. Knowing this position, the inverse kinematics equations for the scissor linkage mechanism can be solved to produce the required horizontal position of the drive pivot (e.g., pivot point 22 in FIG. 1) and corresponding rotational angle of the lead screw.

In accordance with the above-described system, an indicator switch can be positioned at the lower range of the acceptable travel of the drive link to also function as a motor cut-off (limit) switch. Using the switch in this position produces some complicating factors. In this position the system has greater elastic deformation (especially when carrying a payload), and the backlash in the drive train causes the system to move to slightly different positions when it is being driven to a point from different directions. To address these problems, a process was developed to compute an offset correction value for the location of the limit switch.

The offset value is computed by driving the platform to a vertical position in the middle of the operating range of the scissor linkage mechanism using the nominal switch position value in the forward kinematics equations. At this point a measurement is made using a separate measurement instrument (such as a caliper) to determine the actual vertical position. This measurement is then used in the inverse kinematics equations to solve for the required horizontal position (and lead screw angle) needed to achieve this position. The difference between the horizontal position computed by the inverse kinematics using the measured vertical position, and the horizontal position computed using the desired vertical position input by the user, is the horizontal offset error. The new "equivalent" indicator switch position is computed by using forward kinematics with the sum of the horizontal offset error and the initial horizontal offset. This process only needs to be performed once when the initial position of the limit switch is set.

The process disclosed above provides continuous position and velocity measurement for a payload platform or an end effector mounted to a scissor linkage mechanism having any number of scissor stages. Access to continuous position and velocity measurement enables the use of continuous motion controllers, such as a proportional-integral-derivative controllers, which provides the ability to move the platform or end effector to any desired position at a controlled rate.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

The method claims set forth hereinafter should not be construed to require that the steps recited therein be performed in alphabetical order or in the order in which they are recited. Nor should they be construed to exclude any portions of two or more steps being performed concurrently or alternatingly.

The invention claimed is:

1. An automated method, performed by a control system of a scissor linkage system, for controlling the position of a platform which is movable only along a first axis by an actuatable scissor linkage mechanism comprising an actuator and a link coupled to the actuator, the link having one end that is movable only along a second axis orthogonal to the first axis during operation of the actuator, comprising the following steps:

receiving data representing a target platform position along the first axis;

calculating an actuator target position as an inverse kinematics function of said target platform position; and controlling the actuator to move to said actuator target position, which causes the one end of the link to move along the second axis and the platform to move along the first axis.

2. The method as recited in claim 1, further comprising:

generating current actuator position data representing a current position of the actuator;

calculating a current platform position as a forward kinematics function of said current actuator position; and displaying text and/or symbols representing the current platform position.

3. The method as recited in claim 1, further comprising:

receiving data representing a target platform velocity;

generating current actuator position data representing a current position of the actuator;

calculating a target actuator velocity as an inverse Jacobian function of said current actuator position and said target platform velocity; and controlling the actuator to move toward said target actuator position at said target actuator velocity.

4. The method as recited in claim 1, further comprising:

generating current actuator velocity data representing a current velocity of the actuator;

calculating a current platform velocity as a Jacobian function of the current actuator position and the current actuator velocity; and displaying text and/or symbols representing the current platform position and the current platform velocity.

5. A scissor linkage system comprising:

a frame;

a scissor linkage mechanism comprising a first link that is pivotably coupled to said frame at a first pivot point and a second link that is pivotably coupled to said first link at a second pivot point;

a platform coupled to and supported by said scissor linkage mechanism;

an actuator having first and second actuator positions, said first and second links being rotatable relative to each other about said second pivot point and said scissor linkage mechanism being extendible in a direction away from said frame when the position of said actuator changes from said first actuator position to said second actuator position, said platform being in first and second platform positions when said actuator is in said first and second actuator positions respectively; and a computer system comprising memory storing an actuator control program for controlling said actuator, and one or more processing units configured to execute operations in accordance with said actuator control program in response to receipt of data representing a target platform position, said operations comprising:

(a) calculating a target actuator position as an inverse kinematics function of said target platform position; and (b) controlling said actuator to move to said second actuator position when said target platform position is said second platform position.

6. The system as recited in claim 5, wherein said computer system comprises a first processing unit that is programmed to execute operation (a), a second processing unit that is programmed to execute operation (b), and a third processing unit which is programmed to convert commands from said first processing unit which are not in a format acceptable to said second processing unit into commands in a format acceptable to said second processing unit.

7. The system as recited in claim 6, further comprising an actuator position sensor that is coupled to said actuator and in communication with said third processing unit, said actuator position sensor being configured to send to said third processing unit actuator position data representing a current actuator position in a format not acceptable to said first processing unit, and said third processing unit being programmed to convert actuator position data from said actuation position sensor which is not in a format acceptable to said first processing unit into actuator position data which is in a format acceptable to said first processing unit.

8. The system as recited in claim 6, wherein said first processing unit is further programmed to calculate a current platform position as a forward kinematics function of said current actuator position and issue a command to stop further extension of said scissor linkage mechanism in response to said calculated current platform position being equal to said target platform position.

9. The system as recited in claim 8, further comprising a display device connected to receive said current platform position from said first processing unit and display text and/or symbols representing said current platform position received from said first processing unit.

10. The system as recited in claim 5, wherein said actuator comprises a rotating actuator.

11. The system as recited in claim 5, wherein said actuator comprises an extending actuator.

12. The system as recited in claim 5, further comprising an end effector mounted to said platform.

13. A scissor linkage system comprising:

a frame;

a scissor linkage mechanism comprising a first link that is pivotably coupled to said frame at a first pivot point and a second link that is pivotably coupled to said first link at a second pivot point;

a platform coupled to and supported by said scissor linkage mechanism;

an actuator having first and second actuator positions, said first and second links being rotatable relative to each other about said second pivot point and said scissor linkage mechanism being extendible in a direction away from said frame when the position of said actuator changes from said first actuator position to said second actuator position, said platform being in first and second platform positions when said actuator is in said first and second actuator positions respectively;

an actuator position sensor that is coupled to said actuator and configured to output current actuator position data representing a current position of said actuator; and a computer system comprising memory storing an actuator control program for controlling said actuator, and one or more processing units capable of executing operations in accordance with said actuator control program in response to receipt of said current actuator position data and data representing a target platform velocity, said operations comprising:

(a) calculating a target actuator velocity as an inverse Jacobian function of said current actuator position and said target platform velocity; and (b) controlling said actuator to move toward said second actuator position at said target actuator velocity.

14. The system as recited in claim 13, wherein said computer system comprises a first processing unit that is programmed to execute operation (a), a second processing unit that is programmed to execute operation (b), and a third processing unit which is programmed to convert commands from said first processing unit which are not in a format acceptable to said second processing unit into commands in a format acceptable to said second processing unit.

15. The system as recited in claim 14, wherein said actuator velocity sensor is in communication with said third processing unit, said actuator velocity sensor being configured to send to said third processing unit current actuator velocity data representing a current actuator velocity in a format not acceptable to said first processing unit, and said third processing unit being programmed to receive the current actuator velocity data from said actuation velocity sensor and convert the current actuator velocity data into a format which is acceptable to said first processing unit.

16. The system as recited in claim 14, wherein said first processing unit is further programmed to calculate a current platform velocity as a Jacobian function of said current actuator velocity, further comprising a display device connected to receive said current platform velocity from said first processing unit and display text and/or symbols representing said current platform velocity received from said first processing unit.

17. The system as recited in claim 13, further comprising an end effector mounted to said platform.

18. A scissor linkage system comprising:

a frame;

a scissor linkage mechanism mounted to said frame;

a platform coupled to and supported by said scissor linkage mechanism, said platform being movable away from said frame when said scissor linkage mechanism is extended;

an actuator coupled to said scissor linkage mechanism for causing said scissor linkage mechanism to extend when said actuator is moved in an actuation direction;

means for receiving data representing a target platform position;

means for calculating an actuator target position as an inverse kinematics function of said target platform position; and means for controlling said actuator to move to said target actuator position.

19. The system as recited in claim 18, further comprising:

an actuator position sensor that is coupled to said actuator and configured to generate current actuator position data representing a current position of the actuator;

means for calculating a target actuator velocity as an inverse Jacobian function of said current actuator position and said target platform velocity; and means for controlling the actuator to move toward said target actuator position at said target actuator velocity.

20. The system as recited in claim 19, further comprising:

an actuator velocity sensor that is coupled to said actuator and configured to generate current actuator velocity data representing a current velocity of the actuator;

means for calculating a current platform velocity as a Jacobian function of the current actuator position and the current actuator velocity; and means for displaying text and/or symbols representing the current platform position and the current platform velocity.

* * * * *